United States Patent
Owen et al.

(10) Patent No.: US 7,580,982 B2
(45) Date of Patent: *Aug. 25, 2009

(54) EMAIL FILTERING SYSTEM AND METHOD

(75) Inventors: Brad Owen, Mesa, AZ (US); Jason Steiner, Glendale, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 835 days.

This patent is subject to a terminal disclaimer.

(21) Appl. No.: 11/011,630

(22) Filed: Dec. 14, 2004

(65) Prior Publication Data

US 2006/0129644 A1  Jun. 15, 2006

(51) Int. Cl.
*G06F 15/16* (2006.01)
(52) U.S. Cl. .................. 709/206; 709/204; 709/232
(58) Field of Classification Search .............. 709/206, 709/207, 224, 232
See application file for complete search history.

(56) References Cited

U.S. PATENT DOCUMENTS

| | | | |
|---|---|---|---|
| 4,901,341 A | 2/1990 | Carter et al. | |
| 5,247,497 A | 9/1993 | Cohn | |
| 5,283,856 A | 2/1994 | Gross et al. | |
| 5,661,781 A | 8/1997 | DeJager | |
| 5,940,740 A | 8/1999 | Aas et al. | |
| 5,956,521 A | 9/1999 | Wang | |
| 5,995,597 A | 11/1999 | Woltz et al. | |
| 5,999,932 A | 12/1999 | Paul | |
| 6,023,723 A | 2/2000 | McCormick et al. | |
| 6,052,709 A | 4/2000 | Paul | |
| 6,092,101 A | 7/2000 | Birrell et al. | |
| 6,148,064 A | 11/2000 | Christensen et al. | |
| 6,167,434 A | 12/2000 | Pang | |
| 6,167,435 A | 12/2000 | Druckenmiller et al. | |
| 6,185,551 B1 | 2/2001 | Birrell et al. | |
| 6,212,265 B1 | 4/2001 | Duphorne | |
| 6,249,805 B1 | 6/2001 | Fleming, III | |
| 6,266,692 B1 | 7/2001 | Greenstein | |
| 6,335,963 B1 | 1/2002 | Bosco | |
| 6,385,655 B1 | 5/2002 | Smith et al. | |
| 6,393,465 B2 | 5/2002 | Leeds | |
| 6,615,241 B1 | 9/2003 | Miller et al. | |
| 6,615,242 B1 * | 9/2003 | Riemers | 709/206 |
| 6,640,301 B1 | 10/2003 | Ng | |
| 6,654,787 B1 | 11/2003 | Aronson et al. | |
| 6,691,156 B1 | 2/2004 | Drummond et al. | |
| 6,704,772 B1 | 3/2004 | Ahmed et al. | |

(Continued)

OTHER PUBLICATIONS

Crocker, RFC 822, Standard for ARPA Internet Text Messages, Aug. 13, 1982.

(Continued)

*Primary Examiner*—Larry D Donaghue
*Assistant Examiner*—Brian J Gillis
(74) *Attorney, Agent, or Firm*—Sergey G. Zaytsev

(57) ABSTRACT

Systems and methods of the present invention allow filtering out spam and phishing email messages based on the links embedded into the email messages. In a preferred embodiment, an Email Filter extracts links from the email message and obtains desirability values for the links. The Email Filter may route the email message based on desirability values. Such routing includes delivering the email message to a Recipient, delivering the message to a Quarantine Mailbox, or deleting the message.

29 Claims, 3 Drawing Sheets

U.S. PATENT DOCUMENTS

| | | |
|---|---|---|
| 6,868,436 B1 | 3/2005 | Fleming, III |
| 6,880,007 B1 | 4/2005 | Gardos et al. |
| 6,895,430 B1 | 5/2005 | Schneider |
| 6,901,398 B1 | 5/2005 | Horvitz et al. |
| 2002/0035611 A1 | 3/2002 | Dooley |
| 2002/0065903 A1 | 5/2002 | Fellman |
| 2002/0091827 A1 | 7/2002 | King et al. |
| 2002/0129013 A1 | 9/2002 | Thomas |
| 2002/0169840 A1* | 11/2002 | Sheldon et al. ............. 709/206 |
| 2004/0044791 A1 | 3/2004 | Pouzzner |
| 2004/0068460 A1 | 4/2004 | Feeley et al. |
| 2004/0167982 A1 | 8/2004 | Cohen et al. |
| 2004/0205135 A1 | 10/2004 | Hallam-Baker |
| 2004/0210640 A1 | 10/2004 | Chadwick et al. |
| 2004/0221016 A1 | 11/2004 | Hatch et al. |
| 2005/0022008 A1* | 1/2005 | Goodman et al. ........... 713/201 |
| 2005/0102354 A1 | 5/2005 | Hollenbeck et al. |
| 2005/0210106 A1* | 9/2005 | Cunningham ............... 709/206 |
| 2007/0011252 A1 | 1/2007 | Taylor |

OTHER PUBLICATIONS

Braden, RFC 1123, Requirements for Internet Hosts—Application and Support, Oct. 1989.

Freed & Borenstein, RFC 2045, Multipurpose Internet Mail Extensions (MIME), Nov. 1996.

Berners-Lee, et. al., RFC 2396, Uniform Resource Identifiers (URI): Generic Syntax, Aug. 1998.

Resnick, RFC 2822, Internet Message Format, Apr. 2001.

Hall, R. J., How to Avoid Unwanted Email, ACM, Mar. 1998, vol. 41, No. 3, pp. 88-95.

Relson, David, Multiple wordlists, Mar. 15, 2003, http://www.bogofilter.org/pipermail/bogofilter/2003-March/001783.html, pp. 1-3.

Leblanc, David, Graham's spam filter, Aug. 21 2002, http://mail.python.org/pipermail/python-list/2002-August/160114.html, pp. 1-4.

Francis, Erik Max, Graham's spam filter, Aug. 21 2002, http://mail.python.org/pipermail/python-list/2002-August/160122.html, pp. 1-2.

Office Action for U.S. Appl. No. 10/418,006. Jan. 8, 2007.

Response to Office Action for U.S. Appl. No. 10/418,006. Feb. 23, 2007.

Office Action for U.S. Appl. No. 10/418,006. May 18, 2007.

Response to Office Action for U.S. Appl. No. 10/418,006. May 30, 2007.

Advisory Office Action for U.S. Appl. No. 10/418,006. Jun. 7, 2007.

Response to Office Action for U.S. Appl. No. 10/418,006. Jul. 23, 2007.

Office Action for U.S. Appl. No. 10/418,006. Oct. 5, 2007.

Response to Office Action for U.S. Appl. No. 10/418,006. Oct. 10, 2007.

Issue Notification for U.S. Patent No. 7,320,020. Jan. 15, 2008.

Notice of Allowance for U.S. Appl. No. 10/418,006. Nov. 19, 2007.

Office Action for U.S. Appl. No. 11/873,329. Oct. 8, 2008.

Response to Office Action for U.S. Appl. No. 11/873,329. Nov. 10, 2008.

* cited by examiner

EMAIL FILTERING SYSTEM AND METHOD

FIELD OF THE INVENTION

The present invention relates to systems and methods for filtering email messages.

BACKGROUND OF THE INVENTION

Users of computer networks, such as corporate networks or the Internet, routinely send electronic messages to each other. Electronic messages may contain, for example, text, images, links, and attachments. Electronic mail or email is one of the most widely used methods of communication over the Internet due to the variety of data that may be transmitted, the large number of available recipients, speed, low cost and convenience.

Email messages may be sent, for example, between friends, family members or between coworkers thereby substituting for traditional letters and office correspondences in many cases. This is made possible because the Internet has very few restrictions on who may send emails, the number of emails that may be transmitted and who may receive the emails. The only real hurdle for sending emails is the requirement that the sender must know the email address (also called network mailbox) of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Internet users find emails to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and a network connection have been obtained, there are typically few additional costs associated with sending emails. This remains true even if millions, or more, of emails are sent by the same user. Emails thus have the extraordinary power of allowing a single user to send one or more messages to a very large number of people at an extremely low cost.

The Internet has become a very valuable tool for business and personal communications, information sharing, commerce, etc. However, some individuals have abused the Internet. Among such abuses are spam and phishing. Spam, or unsolicited email, is flooding the Internet with many copies of the identical or nearly identical message, in an attempt to force the message on people who would not otherwise choose to receive it. Most spam is commercial advertising, often for dubious products, get-rich-quick schemes, or financial or quasi-legal services.

A single spam message received by a user uses only a small amount of the user's email account's allotted disk space, requires relatively little time to delete and does little to obscure the messages desired by the user. Even a small number of spam messages, while still annoying, would nonetheless cause relatively few real problems. However, the amount of spam transmitted over the Internet is growing at an alarming rate. While a single or small number of spam messages are annoying, a large number of spam can fill a user's email account's allotted disk space thereby preventing the receipt of desired emails. Also, a large number of spam can take a significant amount of time to delete and can even obscure the presence of desired emails in the user's email account.

Spam messages currently comprise such a large portion of Internet communications that they actually cause data transmission problems for the Internet as a whole. Spam creates data log jams thereby slowing the delivery of more desired data through the Internet. The larger volume of data created by spam also requires the Internet providers to buy larger and more powerful, i.e. more expensive, equipment to handle the additional data flow caused by the spam.

Spam has a very poor response rate compared to other forms of advertisement. However, since almost all of the costs/problems for transmitting and receiving spam are absorbed by the recipient of the spam and the providers of the Internet infrastructure, spam nevertheless continues to be commercially viable for a spammer.

Phishing is the luring of sensitive information, such as passwords, credit card numbers, bank accounts and other personal information, from an Internet user by masquerading as someone trustworthy with a legitimate need for such information. Often phishing goes hand-in-hand with spam. The perpetrators send out a large number of email messages to lure as many people as they can to their phishing "nets". Typically, if a user clicks on the link in the email, it would take the user to a webpage that appears very similar to a business that the user might trust. However, this webpage is controlled by the perpetrators and any information entered on the webpage will be forwarded to the perpetrators. The perpetrators may use users' information to commit fraud or other crimes. Often users' information is used for identity theft crimes.

If the user is able to see the URL address of the phishing webpage, the user may realize that it does not belong to a business that the user trusts. Phishers use various techniques to disguise their URL addresses. Among such techniques is hiding the true URL address in the phishing email behind some text, an address of a reputable business, or an image; removing the address bar in the Internet browser; replacing the address bar of the Internet browser with a fake address bar; using IP numbers instead of a domain name in the URL; using domain names that are similar in spelling to the domain names of the reputable businesses; using extremely long URL addresses that the beginning of the address would not be plainly visible in the address bar of the Internet browser; etc. Also, long URL addresses may be harder to analyze for the users, thus further helping the perpetrators in obscuring the true location of their phishing webpages.

There are various techniques used for combating spam and phishing. Among them are spam filtering, email challenge-response systems, maintaining white and/or black lists for email addresses, domain names, and IP (Internet Protocol) numbers, an Internet browser add-ons that show the true location of the pages viewed by the user, etc. Below are a few examples of such systems.

The SenderBase system keeps track of the amount of email messages originating from various domain names and IP addresses. IronPort Systems Inc., a company that maintains SenderBase.org, explains how it works in this example: "If a sender has high global volumes of mail—say 200 Million messages per day—from a network of 5 different domains and 1,700 IP addresses that have only been sending mail for 15 days yet have a high end user complaint rate and they don't accept incoming mail, they will have a very low reputation score [. . . ]. If a sender is a Fortune 500 company, they will likely have much more modest global email volumes—say 500,000 messages per day—will have a smaller number of IPs and domains with a long sending history, they will accept incoming email and have low (or zero) end user complaint rates."

The Bonded Sender Program maintains a white list-like service. The participants of the service must adhere to the rules and post a bond to be included on the white list.

SpamCop maintains a black list of IP addresses and allows users to report spam to a centralized database.

Multiple solutions are created for establishing "societies" of trusted users. Some solutions keep track of user reputation or trust level.

Cloudmark, Inc. provides spam filtering and allows users to block or unblock messages manually. The users' votes on messages (blocking and unblocking) are reported to a centralized database, allowing for better spam filtering by reducing the number of false positives. Each Cloudmark user is assigned with a reputation (trust rating). If a malicious user unblocks a spam message, while a large number of other users block it, the malicious user's reputation will go down. If a user votes along the lines with the rest of the users, her/his reputation raises.

VeriSign, Inc. maintains the list of domain names that were issued a VeriSign SSL digital certificate, so called "Verified Domains List." The company plans to make the list accessible to third parties.

Spoof Stick by CoreStreet Ltd. is an Internet browser add-on that displays the domain name or IP address of the page viewed by the user.

For many email filtering systems to work properly, the sender's email address or at least its domain name part should be correct. Often malicious users forge (spoof) the sender's email address when they send out spam, viruses, or phishing email messages. Among the proposals offered to address this problem are Microsoft's Sender ID and Yahoo's Domain Keys. The Sender ID proposal envisions publishing the sender's email IP addresses in the DNS records of the sender's server, thus allowing the receiver of the email message to compare the originating IP address in the email headers with the IP addresses published in the DNS. If they don't match, the email address was forged. The Domain Keys proposal utilizes public-private key infrastructure. The sender publishes its public key in the DNS records and digitally signs outgoing email messages with its private key. The receiver can validate the sender's signature using the sender's public key published in the DNS records. If the sender's signature cannot be validated, the sender's email address was forged.

Even though multiple systems are being used, the amount of spam, phishing, and other Internet abuses is steadily rising. The existing systems identify trust level of the email senders or analyze the content of the email message. However, an email sender may forge its true identity; an email sender may use a temporary email account; an email sender may use an open relay IP to send email messages; or an email sender may use somebody else's computer to send messages if virus or spy software was installed. Also senders of spam and phishing attacks may provide email message content that is not related to the content of the links embedded in the email or they may use content that looks absolutely legitimate. All of these make it very hard to keep track of email addresses and originating IP addresses, as well as filtering messages based on their content.

Therefore, new systems and methods are needed to overcome the limitations of the current systems and methods. It is desired to create systems and methods that provide more efficient solutions for combating Internet abuses, such as spam and phishing.

SUMMARY OF THE INVENTION

The limitations cited above and others are substantially overcome through one or more of the systems and methods disclosed herein. The systems and methods allow for more efficient filtering of email messages based on the links embedded in emails and/or based on the content of the webpages, objects, images, etc. associated with the links.

One of the embodiments of the present invention discloses a system that filters out email messages based on the content of the webpages located at the URLs embedded in the email message. The system comprises a Sender, a Recipient, an Email Filter, a Link Characterization Means. The system may also include a Quarantine Mailbox. The Sender sends an email message to the Recipient. The Email Filter analyzes links in the email message and refers them to the Link Characterization Means. The Link Characterization Means may provide desirability values for the links back to the Email Filter. The values for the links reflect the desirability of the content of webpages located at the links to the Recipient. Links to the webpages of respected businesses are more desirable than webpages advertising dubious products or phishing webpages. The Email Filter makes a decision based on the values of whether the message should be delivered to the Recipient, saved in the Quarantine Mailbox, or deleted.

An embodiment of the process of the present invention comprises the steps of receiving an email message, extracting links from the email message, obtaining desirability values for the links, and routing the email message based on the desirability values.

The systems and methods of the present invention will help Internet users to combat various forms of Internet abuse, which may include spamming and phishing.

The above features and advantages of the present invention will be better understood from the following detailed description taken in conjunction with the accompanying drawings.

DETAILED DESCRIPTION AND PREFERRED EMBODIMENT

Figure 1:
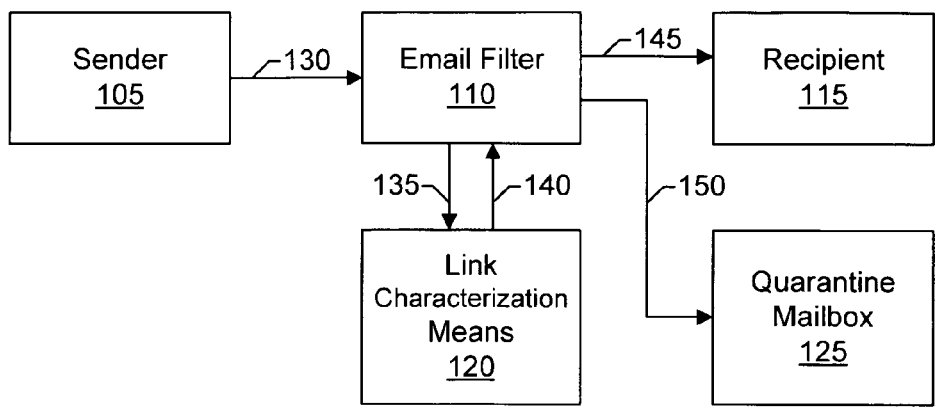
FIG. 1 is a block diagram illustrating an embodiment of the system of the present invention for filtering email messages based on the links embedded in the email messages.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Referring to FIG. 1, an exemplary embodiment of the system of the present invention may include a Sender 105, a Recipient 115, an Email Filter 110, a Link Characterization Means 120, and a Quarantine Mailbox 125. The Sender 105 is a person or a technological means that sends an email message to the Recipient 115. The Recipient 115 is a person or a technological means that has ability to receive the email message. The email message may travel via communication links 130 and 145. The communication links 130 and 145 may be a part of a computer network, such as the Internet.

The Email Filter 110 is situated between the Sender 105 and the Recipient 115 and has the ability to filter email messages. The Email Filter 110 may be located at the Recipient's client level, at the Recipient's mail server level, at a network gateway, or at the Mail Transfer Agent (MTA) level. The Email Filter 110 may be a computer program, a computer device, or a combination thereof. When the email message is received by the Email Filter 110, the Email Filter 110 extracts one or more links from the email message and submits them to the Link Characterization Means 120 via communication link 135.

The Link Characterization Means 120 may be a computer program, a computer device, or a combination thereof. The Link Characterization Means 120 returns desirability values for the links to the Email Filter 110 via communication link 140. The values reflect the desirability of the content of the network resources located at the links. Such resources may include webpages, websites, images, and objects. The links to the webpages of respected businesses will generally be more desirable than webpages advertising dubious products or phishing websites. The values may be, for example, numeric ratings or discrete values. The numeric ratings may be in a range from 0 to 1, from 0 to 100, or any other range. The discrete values may indicate that the content of a webpage associated with the link is a website promulgated by spammers or a phishing website. For example, a discrete value of 0 may mean the webpage is good, a 1 may mean the website is promulgated by spammers, and a 2 may mean the website is a phishing website.

If there is more than one link in the email message, the overall desirability value may be calculated as a minimum, maximum, median, average, sum, or any other function of the desirability values of the plurality of the links. The overall desirability value may be calculated by the Email Filter 110 or by the Link Characterization Means 120.

After the Email Filter 110 receives the values from the Link Characterization Means 120, the Email Filter 110 determines how to route (divert, process, deliver, dispose) the email message. The Email Filter 110 may be set to route email based on predefined ranges. For example, if the desirability rating is between 80 and 100, then the email message may be considered "good" and may be delivered to the Recipient 115. If the desirability rating is between 0 and 20, the email message may be considered as "bad" (spam, phishing, etc.) and may be deleted. If the desirability rating is between 20 and 80, the email message may be forwarded to the Quarantine Mailbox 125 for further review.

Further, the system of FIG. 1 may comprise one or more Senders 105 and/or one or more Recipients 115 and/or may process/filter one or more email messages.

The system of FIG. 1 may be implemented as a subsystem of a comprehensive spam filtering system. Such comprehensive spam filtering system may also include white/black lists filtering, keywords filtering, probability filtering, email address and IP filtering, etc.

Figure 2:
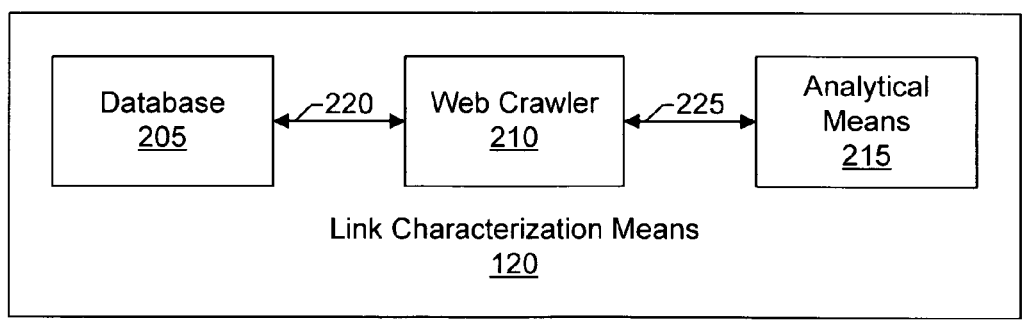
FIG. 2 is a block diagram illustrating a sample content of the Link Characterization Means of FIG. 1.

Referring to FIG. 2, the Link Characterization Means 120 may comprise of a Database 205. The Database 205 may store one or more links with associated desirability values. The links may include URLs, IP addresses, domain names, etc. The Database entries may be populated manually by one or more persons who reviewed the content of the links or this process may be done automatically. To implement automatic Database entry the Link Characterization Means 120 may further comprise a Web Crawler 210. The Web Crawler 210 may download content of the webpages at the links and forward the content to an Analytical Means 215. The Analytical Means 215 may be a keyword or probability software program that can generate desirability values for the links and store them into the Database 205. The data exchange between the Database 205, the Web Crawler 210, and the Analytical Means 215 may be performed via communication links 220 and 225.

Figure 4:
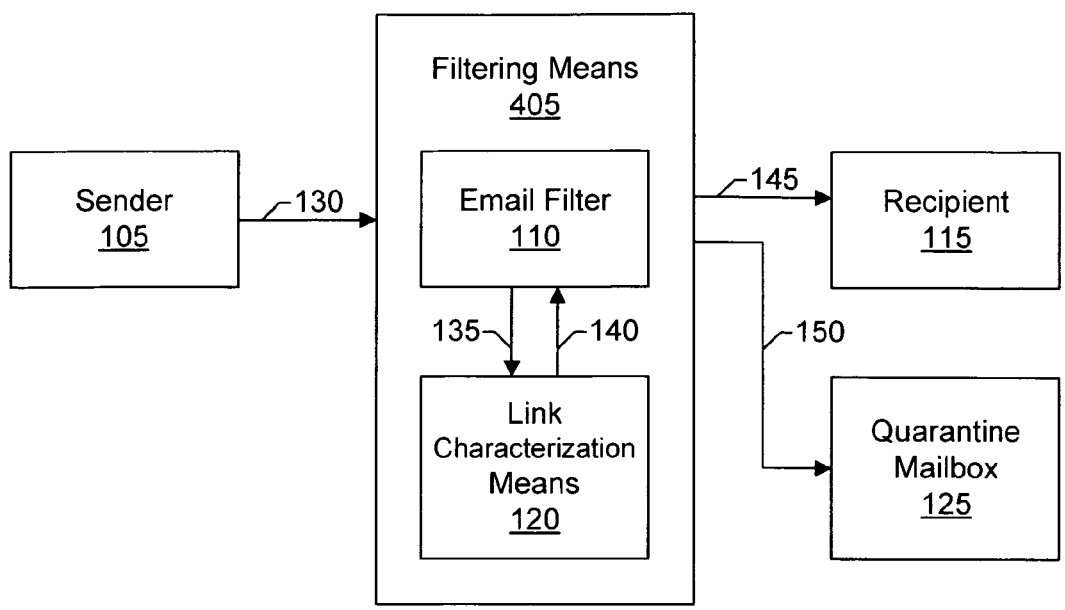
FIG. 4 is a block diagram illustrating an embodiment of the system of the present invention comprising Filtering Means.

In an alternative embodiment, shown in FIG. 4, the Email Filter 110 and Link Characterization Means 120 may be parts of a Filtering Means 405. The Filtering Means 405 may be a computer program, a computer device, or a combination thereof.

Figure 3:
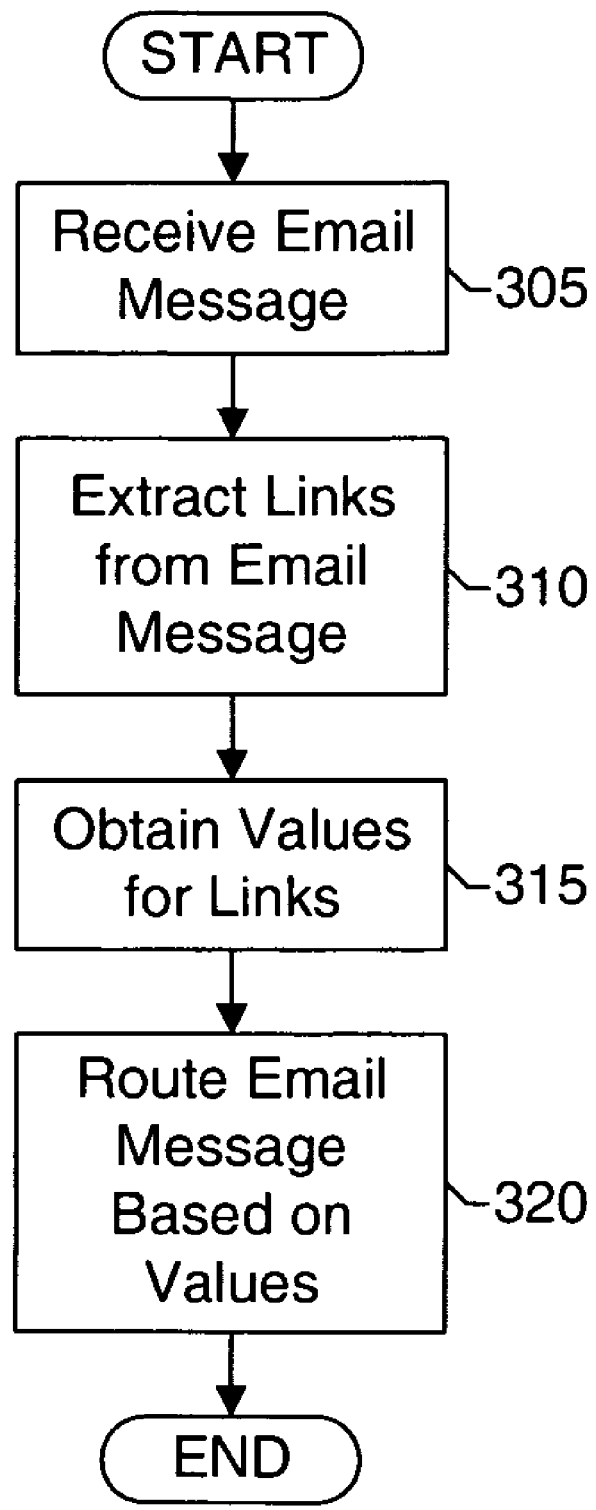
FIG. 3 is a flowchart illustrating a method of the present invention for filtering email messages based on the links embedded in the email messages.

FIG. 3 illustrates an embodiment of the process of the present invention. The process comprises the steps of receiving an email message (Step 305), extracting links from the email message (Step 310), obtaining desirability values for the links (Step 315), and routing the email message based on the desirability values (Step 320).

The Step 305 (receiving the email message) may be performed by an Email Filter, which may be located at the recipient's client level, at the recipient's mail server level, at the network gateway, or at the Mail Transfer Agent (MTA). The links at the Step 310 are the links to network resources (e.g. webpages, websites, images, objects, etc.). The links may be "clickable," thus by clicking on the link the Recipient may be navigated to a website specified in the link. Other links may embed images and objects into the email message. The values for the links at the Step 315 may be obtained from a database. Typically, the database would hold a list of links commonly used by spammers and phishers.

The desirability ratings in the systems and methods of the present invention may be replaced with the "spamming" ratings. The higher the "spamming" rating, the less likely email users are interested in seeing the email message.

U.S. Patent Application No. 10418006 entitled "A Mail Server Probability Spam Filter" filed on Apr. 17, 2003 is hereby incorporated in its entirety by reference.

U.S. Patent Application No. 10977373 entitled "Tracking Domain Name Related Reputation" filed on Oct. 29, 2004 is hereby incorporated in its entirety by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

The invention claimed is:

1. A method, comprising the steps of:
   a) building a general mail corpus, a general spam corpus, a user mail corpus and a user spam corpus, b) building a general probability table based on said general mail corpus and said general spam corpus, wherein said general probability table comprises a list of tokens and corresponding probabilities of a token being a part of a spam email message,
c) building a user probability table based on said user mail corpus and said user spam corpus, wherein said user probability table comprises a list of tokens and corresponding probabilities of a token being a part of a spam email message,
d) receiving an email message,
e) extracting a link from said email message,
f) downloading a content of a resource referred by said link,
g) parsing said content into a plurality of tokens,
h) finding a token score for each token in said plurality of tokens, comprising the steps of:
  h1) searching said user probability table for each token,
  h2) if said token is not listed in said user probability table, searching said general probability table for said token, and
  h3) if said token is not listed in said general probability table, ignoring said token or setting said token to a nominal value,
i) determining a desirability value for said link, and
j) routing said email message based on said desirability value.

2. The method of claim 1, wherein said link refers to a resource.

3. The method of claim 2, wherein said resource is a webpage or a website.

4. The method of claim 1, wherein said link is a URL.

5. The method of claim 1, wherein said link is an IP address.

6. The method of claim 1, wherein said link is a domain name.

7. The method of claim 1, wherein said routing said email message comprises delivering said email message to a Recipient.

8. The method of claim 1, wherein said routing said email message comprises deleting said email message.

9. The method of claim 1, wherein said routing said email message comprises delivering said email message to a Quarantine Mailbox.

10. A method, comprising the steps of:
a) building a general mail corpus, a general spam corpus, a user mail corpus and a user spam corpus,
b) building a general probability table based on said general mail corpus and said general spam corpus, wherein said general probability table comprises a list of tokens and corresponding probabilities of a token being a part of a spam email message,
c) building a user probability table based on said user mail corpus and said user spam corpus, wherein said user probability table comprises a list of tokens and corresponding probabilities of a token being a part of a spam email message,
d) a Sender transmitting an email message addressed to a Recipient,
e) an Email Filter receiving said email message,
f) said Email Filter extracting a link from said email message,
g) downloading a content of a resource referred by said link,
h) parsing said content into a plurality of tokens,
i) finding a token score for each token in said plurality of tokens, comprising the steps of:
  i1) searching said user probability table for each token,
  i2) if said token is not listed in said user probability table, searching said general probability table for said token, and
  i3) if said token is not listed in said general probability table, ignoring said token or setting said token to a nominal value,
j) a Link Characterization Means determining a desirability value for said link, and
k) said Email Filter routing said email message based on said desirability value.

11. The method of claim 10, wherein said Email Filter comprises a computer program.

12. The method of claim 10, wherein said Email Filter comprises a computer device.

13. The method of claim 10, wherein said Email Filter is located at a Recipient's client level.

14. The method of claim 10, wherein said Email Filter is located at a Recipient's mail server level.

15. The method of claim 10, wherein said Email Filter is located at a network gateway.

16. The method of claim 10, wherein said Email Filter is located at a Mail Transfer Agent.

17. The method of claim 10, wherein said resource is a webpage or a website.

18. The method of claim 10, wherein said link is a URL.

19. The method of claim 10, wherein said link is an IP address.

20. The method of claim 10, wherein said link is a domain name.

21. The method of claim 10, wherein said routing said email message comprises delivering said email message to said Recipient.

22. The method of claim 10, wherein said routing said email message comprises deleting said email message.

23. The method of claim 10, wherein said routing said email message comprises delivering said email message to a Quarantine Mailbox.

24. The method of claim 10, wherein said Link Characterization Means comprises a computer program.

25. The method of claim 10, wherein said Link Characterization Means comprises a computer device.

26. The method of claim 10, wherein said Link Characterization Means comprises a database, wherein said database includes an ability to store said desirability value for said link.

27. The method of claim 10, wherein said Link Characterization Means comprises a web crawler, wherein said web crawler includes an ability to download said content of said resource.

28. The method of claim 10, wherein said email message travels from said Sender to said Recipient via a computer network.

29. The method of claim 28, wherein said computer network is the Internet.

* * * * *